United States Patent
Hofstee et al.

(10) Patent No.: US 10,719,399 B2
(45) Date of Patent: Jul. 21, 2020

(54) SYSTEM COMBINING EFFICIENT RELIABLE STORAGE AND DEDUPLICATION

(71) Applicant: International Business Machines Corporation, Armonk, NY (US)

(72) Inventors: H. Peter Hofstee, Austin, TX (US); Thomas S. Hubregtsen, Munich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 15/864,123

(22) Filed: Jan. 8, 2018

(65) Prior Publication Data

US 2019/0213077 A1 Jul. 11, 2019

(51) Int. Cl.
*G06F 11/10* (2006.01)
*G06F 11/14* (2006.01)

(52) U.S. Cl.
CPC ...... *G06F 11/1088* (2013.01); *G06F 11/1076* (2013.01); *G06F 11/1453* (2013.01); *G06F 2201/805* (2013.01)

(58) Field of Classification Search
CPC ............. G06F 11/1088; G06F 11/1453; G06F 2201/805; G06F 11/1076
See application file for complete search history.

(56) References Cited

U.S. PATENT DOCUMENTS

| | | | |
|---|---|---|---|
| 8,199,911 B1 | 6/2012 | Ynn-Pyng | |
| 8,478,951 B1 | 7/2013 | Healey et al. | |
| 8,650,156 B1 * | 2/2014 | McHugh | G06F 16/219 707/638 |
| 8,930,612 B2 | 1/2015 | Goss | |
| 8,930,687 B1 | 1/2015 | Robinson | |
| 9,037,856 B2 | 5/2015 | Bestler | |
| 9,081,771 B1 | 7/2015 | Faibish | |
| 9,086,819 B2 | 7/2015 | Panchbudhe | |
| 9,201,890 B2 | 12/2015 | Jayaraman et al. | |

(Continued)

OTHER PUBLICATIONS

J.-Y. Ha, et al.,"Deduplication with Block-Level Content-Aware Chunking for Solid State Drives (SSDs)", IEEE International Confernece on High Performance Computing and Communications, 2013, p. 1-8.

(Continued)

*Primary Examiner* — Paul Contino
(74) *Attorney, Agent, or Firm* — Cantor Colburn LLP; Brian Welle

(57) ABSTRACT

Aspects of the invention include receiving data that includes a group of n symbols to be written to a plurality of storage units. The group of symbols is mapped into a codeword of n+k symbols, each assigned to one of the storage units. The codeword is configured to allow at least one of the n symbols to be reconstructed using a subset of the n+k symbols. At least one of the n+k symbols is assigned to one of the storage units based at least in part on content of the at least one of the n+k symbols. Writing each of the n+k symbols to its assigned storage unit in the plurality of storage units is initiated. The writing includes optimizing storage capacity of the assigned storage unit based at least in part on determining that the symbol has the same content as another symbol previously stored in the storage unit.

14 Claims, 9 Drawing Sheets

500

| Logical Block # 502 | Target Disk Based on Hash Value 504 | RAID Group ID 506 | Location of Parity Block 508 |
|---|---|---|---|
| 1 | 3 | 1 | |
| 2 | 1 | 1 | 2 |
| 3 | 4 | 2 | |
| 4 | 1 | 2 | 2 |
| 5 | 1 | 3 | |
| 6 | 1 | 4 | |
| 7 | 2 | 3 | 3 |
| 8 | 2 | 4 | 3 |
| 9 | 4 | 5 | |
| 10 | 3 | 5 | 5 |

(56) References Cited

U.S. PATENT DOCUMENTS

| | | | |
|---|---|---|---|
| 9,298,386 B2 | 3/2016 | Balwin et al. | |
| 9,336,092 B1 | 5/2016 | Li | |
| 9,348,696 B2 | 5/2016 | Colgrove et al. | |
| 9,465,823 B2 | 10/2016 | Shergil | |
| 9,503,127 B2 | 11/2016 | Wideman | |
| 9,606,870 B1 | 3/2017 | Meiri et al. | |
| 9,766,837 B2 | 9/2017 | McGlaughlin et al. | |
| 2009/0132619 A1* | 5/2009 | Arakawa | G06F 3/0605 |
| 2014/0032861 A1* | 1/2014 | Islam | G06F 3/0685 |
| | | | 711/162 |
| 2014/0380127 A1* | 12/2014 | Alexeev | G06F 11/1076 |
| | | | 714/770 |
| 2015/0058583 A1* | 2/2015 | Baldwin | G06F 3/0641 |
| | | | 711/162 |
| 2015/0089282 A1* | 3/2015 | Taranta, II | G06F 11/1076 |
| | | | 714/6.24 |
| 2015/0161000 A1 | 6/2015 | Kim et al. | |
| 2016/0087653 A1* | 3/2016 | Yang | H03M 13/096 |
| | | | 714/752 |
| 2018/0018235 A1* | 1/2018 | Arslan | G06F 11/1453 |
| 2019/0087271 A1* | 3/2019 | Taranta | G06F 11/1088 |
| 2019/0347162 A1* | 11/2019 | Moussa | G06F 3/0604 |

OTHER PUBLICATIONS

M. W. Storer, et al.,"Secure Data Deduplication", StorageSS, AMC, Oct. 31, 2008, p. 1-10.

\* cited by examiner

| Logical Block # 502 | Target Disk Based on Hash Value 504 | RAID Group ID 506 | Location of Parity Block 508 |
|---|---|---|---|
| 1 | 3 | 1 | |
| 2 | 1 | 1 | 2 |
| 3 | 4 | 2 | |
| 4 | 1 | 2 | 2 |
| 5 | 1 | 3 | |
| 6 | 1 | 4 | |
| 7 | 2 | 3 | 3 |
| 8 | 2 | 4 | 3 |
| 9 | 4 | 5 | |
| 10 | 3 | 5 | 5 |

SYSTEM COMBINING EFFICIENT RELIABLE STORAGE AND DEDUPLICATION

BACKGROUND

Embodiments of the present invention relate in general to storage systems and more specifically to providing systems that combine efficient reliable storage and deduplication.

Enterprises generally implement two broad types of storage infrastructure for storing their application data. Direct-attached storage (DAS) includes storage devices or disks that are attached to the systems that run the application workloads. The devices and the stored data in DAS are private and typically in one or two server systems or virtual machines hosted in the physical server hardware. Various high-availability configurations can be configured using server hardware. The data in DAS devices can be replicated to other storage systems, which usually requires replication features provided with certain application software. Networked enterprise storage infrastructure, another type of storage infrastructure, typically includes a storage area network (SAN) and network-attached storage (NAS). SAN and NAS provide the infrastructure to share storage devices and data over fiber channel or Ethernet networks with a large number of server system and applications within the enterprise data centers. The data in SAN can be replicated across two or more data centers for high availability and disaster recover requirements by using the required network infrastructure that spans across geographically dispersed data centers.

Information technology managers have the critical task of protecting application data against loss of data due to hardware failures, security invasion, power outages, and natural disasters, to name a few. Redundant Array of Independent Disks (RAID) is the technology commonly used in DAS, and also in networked storage SAN-based storage subsystems to provide reliable data protection against physical disk failure within an array in the subsystems. When multiple physical disks are set up to use the RAID technology, they are said to be in a RAID array. Although the array itself is distributed across multiple disks, the array is seen by the computer user and operating system as a single disk. The operating system accesses the single logical disk and the RAID adapter handles the data distribution in the multiple disks in the array based on the RAID level with which the array is configured. There are a number of RAID levels including RAID 1, also called mirroring, which writes the same copy of data across all disks. RAID 5 includes block level striping with distributed parity. The parity information is distributed across all the disks in the RAID array. If one disk in the array fails, there is no data loss because all the data can be restored to a replacement disk. RAID 5 typically includes storing each symbol, or block of a codeword on a different disk to support recovery of the codeword if a disk in the array fails.

Business data growth rates are continuing to increase rapidly, and as a result retention and retrieval requirements for new and existing data are expanding, driving still more data to disk storage. As the amount of disk-based data continues to grow, there is an ever-increasing focus on improving data storage efficiencies across the information infrastructure. Data deduplication is a technique for achieving data reduction that consolidates redundant copies of a file or file subcomponent. Incoming or existing data are standardized into "chunks" that are then examined for redundancy. If duplicates are detected, then pointers are shifted to reference a single copy of the chunk and the extraneous duplicates are then released. Chunking refers to breaking data down into standardized units that can be examined for duplicates. Depending on the technology and locality of the deduplication process, these units can be file or more granular components such as blocks. Inline deduplication consolidates data before it is written to disk which prevents duplicate chunks from being written to the same storage unit. For data deduplication that is performed by the storage system to be most effective, blocks having the same content should be steered to the same storage unit.

To support deduplication at the unit of storage, a target storage unit is chosen based on the value of a chunk (symbol or block, stripe, etc.) that is stored to ensure that if the same symbol is stored more than once that all copies are targeted to the same unit of storage. On the other hand, a typical efficient reliable storage system, that implements RAID for example, selects target storage units by ensuring that all the symbols in a codeword are stored on different storage units. These two approaches have different goals, deduplication is aimed at minimizing the amount of data that is stored and redundant storage provides recoverability by adding symbols to a codeword from which the data that is stored can be recovered in the case of failure and spreading the data across multiple storage units. Contemporary storage systems provide either the storage savings of deduplication or the recoverability of redundant storage, but not both.

Accordingly, while storage systems are suitable for their intended purpose the need for improvement remains, particularly in providing storage systems that combine redundant storage and deduplication.

SUMMARY

Embodiments of the present invention include methods, systems, and computer program products for systems that combine efficient reliable storage and deduplication. A non-limiting example method includes receiving data to be written to a plurality of storage units. The data includes a group of n symbols. The group of n symbols is mapped into a codeword of n+k symbols, and each of the n+k symbols is assigned to one of the plurality of storage units. The codeword is configured to allow at least one of the n symbols to be reconstructed using a subset of the n+k symbols. At least one of the n+k symbols is assigned to one of the plurality of storage units based at least in part on content of the at least one of the n+k symbols. Writing each of the n+k symbols to its assigned storage unit in the plurality of storage units is initiated. The writing includes for each of the n+k symbols, optimizing storage capacity of the assigned storage unit based at least in part on determining that the symbol has the same content as another symbol previously stored in the storage unit. An advantage of one or more embodiments of the present invention includes combining the recoverability of efficient reliable storage with the storage space savings of deduplication.

All of the n+k symbols can be assigned to a different one of the plurality of storage units based at least in part on their content, which can provide additional deduplication and storage space savings.

The codeword can be configured to allow all of the n symbols to be reconstructed using a subset of the n+k symbols, which can provide additional recoverability and reliability.

The data can be encrypted prior to the mapping, which can provide additional data security.

A hash value of the content of the at least one of the n+k symbols can be used to assign the one of the plurality of storage units, which can provide additional compute cost savings.

The optimizing can include storing a pointer to the symbol previously stored in the storage unit and not writing the symbol to the storage unit, which can provide additional storage space savings.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
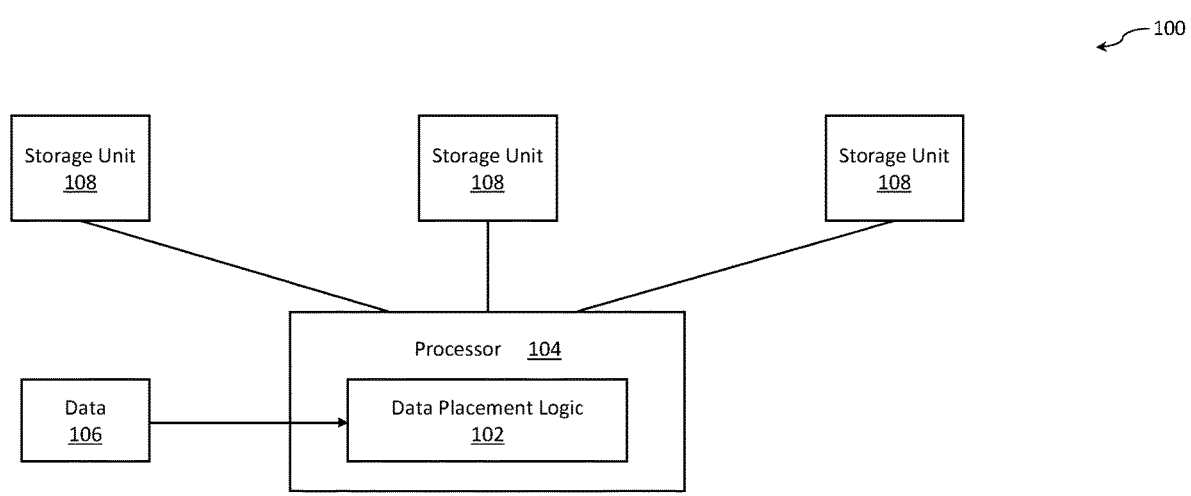
FIG. 1 depicts a system that combines efficient reliable storage and deduplication in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention provide a storage system that combines the recoverability of efficient reliable storage with the storage space savings of deduplication. Identical symbols are directed to the same storage units while symbols in a particular codeword are stored on a sufficient number of different storage units to allow the original data to be reconstructed in the case of storage unit failure. Content aware mapping, which is used to ensure that identical symbols are stored on the same unit of storage, is separated from grouping for efficient reliable storage, which is used to ensure that a sufficient number of symbols within a codeword are stored on different units of storage. Blocks, or symbols, can be mapped to storage units based on their content using, for example, a hash function. Codewords can be formed from the symbols such that a sufficient number of symbols in a codeword maps to different storage units so that the codeword can be recovered if one of the storage units storing one or more of the symbols in the codeword is not available.

As used herein, the term "symbol" refers to a group of bits that are stored/retrieved together from the same storage unit such as, but not limited to, a block, a blob (variable length block), a byte(s), a bit(s), a chunk, and a stripe. Write data that is received is divided into symbols before being written to the storage units. As used herein, the term "codeword" refers to a unit of recovery that includes a group of symbols containing a larger set of symbols, for example the original data symbols and additional parity symbols, or redundant symbols, used for recovery of the codeword. The redundant symbols can include, but are not limited to parity, bi-directional parity, erasure codes, and other types of error correcting codes. While generally the redundant symbols are added to the original data symbols, the only requirement is that the original data symbols can be recovered from the codeword in the case of storage unit failure. The number of symbols required to store the original data can be represented as "n" and the additional redundant information as "k" additional symbols, and a codeword is said to have "n+k" symbols. The number of storage units can be represented as "n+l+m" where "m" is greater than zero and "n+l" is the number of symbols required to recover the original data in the codeword. As known in the art, efficient reliable storage can be implemented using an erasure code that transforms a message of "n" symbols into a longer message (e.g., a codeword) with "n+k" symbols such that the original message can be recovered from a subset "n+l" of the "n+k" symbols.

As used herein, the term "storage unit" refers to anything that can store data, and includes all or a subset of storage devices in a data center or storage network or cloud network such as, but not limited to a disk, a group of disks, a storage node, a storage server, a tape drive, and a data center. The efficient reliable storage described herein can provide recovery of a codeword if a storage unit containing a portion of the codeword fails. Examples of efficient reliable storage include, but are not limited to: redundant array of independent disks (RAID), erase codes, and block based RAID.

Turning now to FIG. 1, a system 100 for combining efficient reliable storage and deduplication is generally shown in accordance with one or more embodiments of the present invention. The system 100 includes a processor 104 and a plurality of storage units 108. The storage units 108 shown in FIG. 1 can be of the same or different types. The processor 104 shown in FIG. 1 includes data placement logic 102 that is used to determine placement of data 106 among the different storage units 108. Data placement logic 102 can be implemented using software instructions and/or hardware instructions. Any number of storage units 108 can be implemented as long as the number of storage units 108 is greater than or equal to the number of symbols in a codeword to allow for placing each symbol in a codeword on a different storage unit 108. In addition, the data placement logic 102 can be executed by the processor 104 as shown in FIG. 1 or by a different processor (not shown). The processor 104 can be communicatively coupled to the storage units 108 via a direct connection and/or wirelessly via one or more networks.

Figure 2:
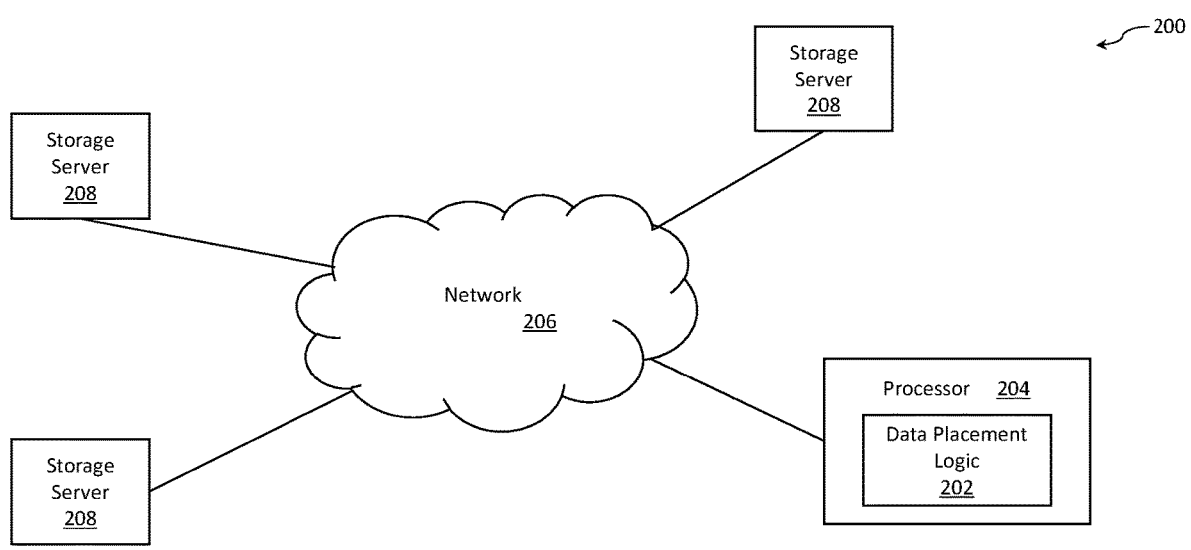
FIG. 2 depicts a cluster storage system that combines efficient reliable storage and deduplication in accordance with one or more embodiments of the present invention.

Turning now to FIG. 2, a cluster storage system 200 that combines efficient reliable storage and deduplication is generally shown in accordance with one or more embodiments of the present invention. As shown in FIG. 2, storage units that are storage servers 208 (also referred to as "file servers") are communicatively coupled to processor 204 via network 206. The processor 204 shown in FIG. 2 includes data placement logic 202 that is used to determine placement of data among the different storage servers 208. Data placement logic 202 can be implemented using software instructions and/or hardware instructions. Any number of storage servers 208 can be implemented as long as the number of storage servers 208 is greater than or equal to the number of symbols in a codeword to allow for placing each symbol in a codeword on a different storage server 208. In addition, the data placement logic 202 can be executed by the processor 204 as shown in FIG. 2 or by a different processor (not shown). The cluster storage system 200 shown in FIG. 2 can be implemented by a storage area network (SAN) and/or network-attached storage (NAS). An advantage of the cluster storage system 200 shown in FIG. 2 is that data reliability/recoverability is increased by having a codeword span multiple storage servers in multiple physical locations. Another advantage is that by performing deduplication storage capacity is optimized by requiring less space to store the data. The space savings of deduplication can be used to offset the additional space required to provide recovery.

Figure 3:
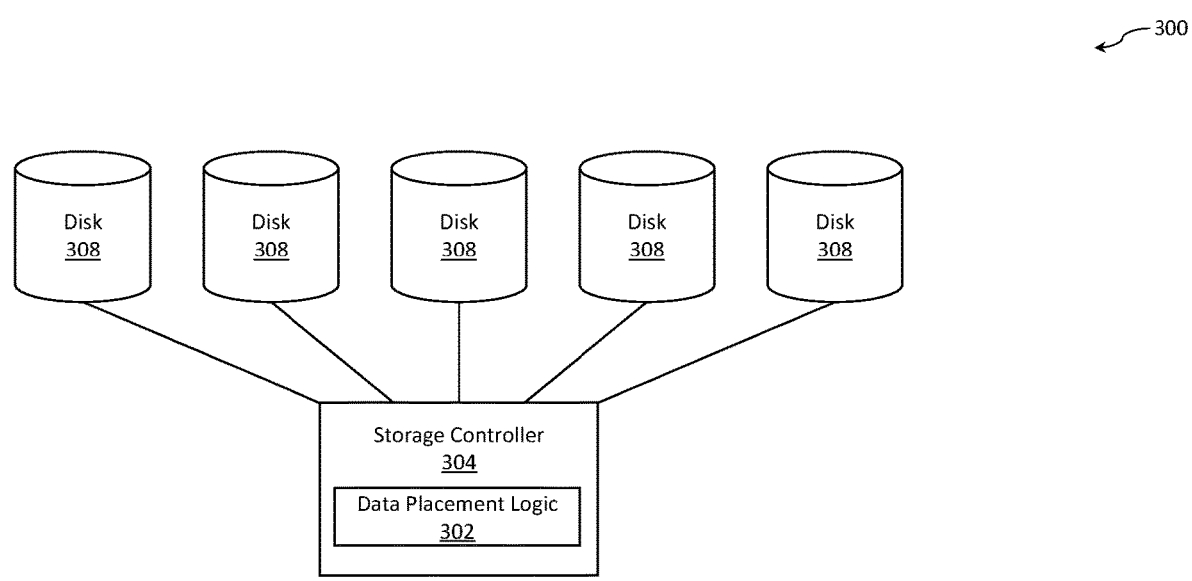
FIG. 3 depicts a disk storage system that combines efficient reliable storage and deduplication in accordance with one or more embodiments of the present invention.

Turning now to FIG. 3, a disk storage system 300 that combines efficient reliable storage and deduplication is generally shown in accordance with one or more embodiments of the present invention. The embodiment shown in FIG. 5 can be implemented, for example, by a RAID configuration. As shown in FIG. 3, disk storage devices 308 are communicatively coupled to memory controller 304. The disk storage devices 308 can be implemented by devices such as, but not limited to hard disk drives (HDD), removable disk drives, and/or optical disk drives. The storage controller 304 shown in FIG. 3 includes data placement logic 302 that is used to determine placement of data among the different disk storage devices 308. Data placement logic 302 can be implemented using software instructions and/or hardware instructions. Any number of disk storage devices 308 can be implemented as long as the number of disk storage devices 308 is greater than or equal to the number of symbols in a codeword required to recover the original data to allow for placing a sufficient number of symbols in a codeword on different disk storage devices 308. In addition, the data placement logic 302 can be executed by the storage controller 304 as shown in FIG. 3 or by a different processor (not shown). The storage controller 304 can be communicatively coupled to the disk storage devices 308 via a direct connection and/or wirelessly via one or more networks. The disk storage system 300 shown in FIG. 3 can be implemented by direct-attached storage (DAS). An advantage of the disk storage system 300 shown in FIG. 3 is data recoverability provided by having a codeword that spans multiple disk storage devices 308. Another advantage is that by performing deduplication storage capacity is optimized by requiring less space to store the data. The space savings of deduplication can be used to offset the additional space required to provide recovery.

Figure 4:
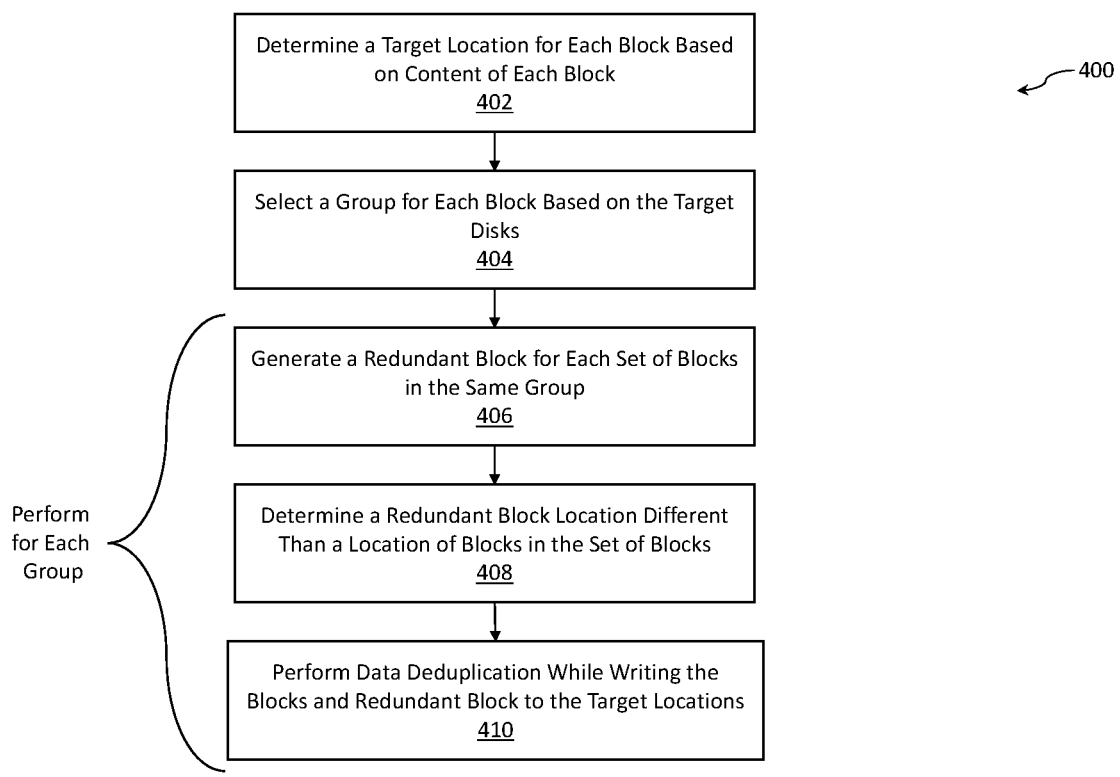
FIG. 4 is a flow diagram of a process for combining efficient reliable storage and deduplication in accordance with one or more embodiments of the present invention.

Turning now to FIG. 4, a flow diagram 400 of a process for combining efficient reliable storage and deduplication is generally shown in accordance with one or more embodiments of the present invention. The processing shown in FIG. 4 can be performed, for example, by data placement logic 102 of FIG. 1 or data placement logic 202 of FIG. 2 or data placement logic 302 of FIG. 3. At block 402, content based mapping is performed to determine a target location (e.g., a particular storage unit) for each block, or symbol, in a codeword to be written to a storage unit. For each block, a target location is determined based on the content of the block (e.g., the bits contained in the block). In accordance with one or more embodiments of the present invention, the determining includes generating a hash value of the content of the block and assigning the block to a particular storage unit based on the hash value. Ranges of hash values can be previously assigned to particular storage units. Examples of hash functions that can be used to generate the hash value include, but are not limited to modulo operations, division by a prime number, cyclotomic polynomials, or other functions that map a block to a storage unit that create a reasonable distribution of blocks across the available storage units. At block 404 of FIG. 4, the blocks are divided into groups such that each block in each group has a different target location that was determined based on its content.

Blocks 406-410 of FIG. 4 are performed for each group. At block 406, one or more redundant blocks used for recovery are generated based on contents of the blocks in the group. The redundant blocks can be generated in any manner known in the art, such as, but not limited to: generating a RAID 5 erasure block; generating bi-directional parity blocks; generating Reed-Solomon blocks, etc. The extended set of blocks, together make up a codeword that is recoverable as a unit. At block 408, a target location different than the target locations of blocks in the group is selected for the redundant block(s) (e.g., parity block). At block 410, the codeword is written to the target locations by the storage system using inline block based deduplication. In accordance with one or more embodiments of the present invention, a hash function of the block to be stored is calculated (a different hash function than the one used to determine the storage unit) and used to retrieve blocks, if any, that have the same hash, and those blocks are compared to the block to be stored. If an identical block is found then instead of storing the block itself a pointer to the block is stored, requiring substantially less storage. Also, a reference count can be incremented to ensure that a block is erased only after all references to the block are erased. The deduplication logic may be implemented in software, in a storage controller, and/or inside a storage device.

Figure 5:
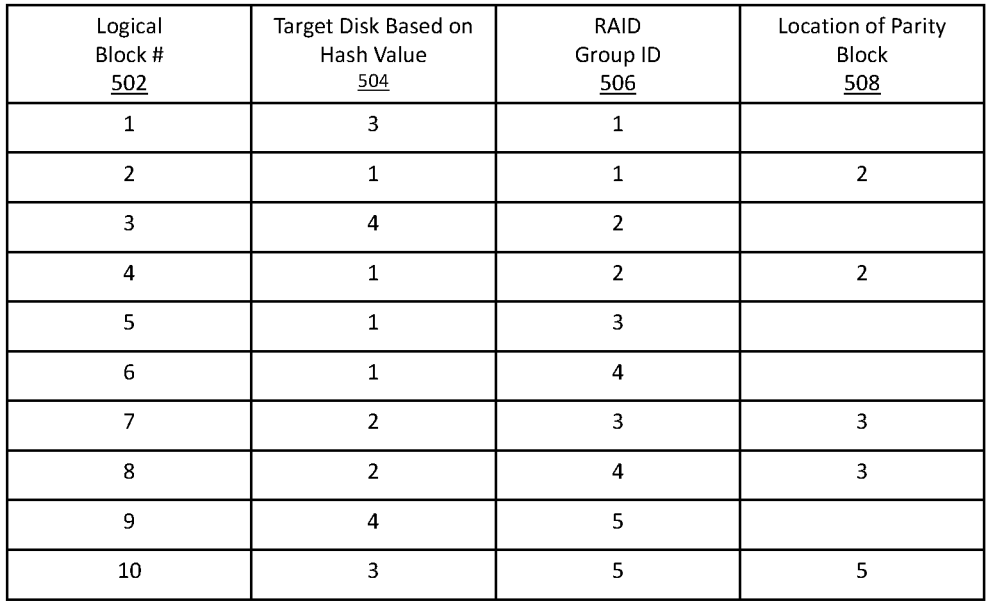
FIG. 5 is a table that shows storage location assignments of data and parity blocks to combine efficient reliable storage and deduplication in accordance with one or more embodiments of the present invention.

Turning now to FIG. 5, a table 500 of example storage location assignments of data and parity blocks to combine efficient reliable storage and deduplication is generally shown in accordance with one or more embodiments of the present invention. The example shown in FIG. 5 uses RAID as an example of efficient reliable storage and parity blocks as examples of redundant blocks, however embodiments should not be construed to being limited to RAID as other types of efficient reliable storage can also be utilized. Columns in the table include logical block number 502, target disk based on hash value 504, RAID group identifier 506, and location of parity block 508. In the example shown in FIG. 5, ten blocks (or symbols) are to be stored, each parity block along with two of the ten blocks form a codeword, and the storage units include five disks numbered 1 through 5. Thus, the number of symbols that contain data can be represented as "n=2", the number of additional symbols as "k=1", and the number of storage units is 5 with "m=1." A target location for each of the logical blocks is determined, in this example, by applying a hash function to content of each of the ten blocks. As shown in table 500, the target disk for logical block "1" is disk "3", for logical block "2" is disk "1", for logical block "3" is disk "4", and so on with each logical block being assigned a target storage unit.

The blocks are grouped into parity groups, or RAID groups, based on their determined target locations. As shown in the table 500, logical blocks 1 and 2 have different target disks and are assigned to RAID group "1", logical blocks 3 and 4 have different target disks and are assigned to RAID group "2." Logical blocks 5 and 6 have the same target disk (disk 1) so they cannot be in the same RAID group. Logical block 5 is assigned to RAID group "3" along with logical block 7. Logical block 6 is assigned to RAID group "4" along with logical block 8. Logical blocks 9 and 10 have different target disks and are assigned to RAID group "5."

A parity block is generated for each of the RAID groups and a target disk for the parity block is determined by selecting a disk that is different than the target disks of the other blocks in the RAID group. As shown in the table 500 of FIG. 5, the target disk of the parity block of RAID group 1 is disk 2, and thus the codeword of RAID group 1, which can be recovered as a unit, is stored across disks 1, 2, and 3. Similarly, the codeword of RAID group 2 is stored across disks 1, 2, and 4; the codeword of RAID group 3 is stored across disks 1, 2, and 3; the codeword of RAID group 4 is stored across disks 1, 2, and 3; and the codeword of RAID group 5 is stored across disks 3, 4, and 5.

In the example shown in FIG. 5, the RAID groups are selected by going sequentially through the logical blocks in order of the logical block numbers 502 to find two logical blocks that have hash values that point to different disks, and the location of the parity blocks are selected by sequentially going through the available disks and selecting the first one that fits the criteria. These are just examples of one way to assign groups and parity block locations and exemplary embodiments of the present invention can include any manner of assigning RAID groups and target disks as long as symbols within a codeword are assigned to different disks.

In accordance with one or more embodiments, the parity block is assigned to a target disk based on its content using, for example, a hash function. The target disk of the parity block can be adjusted if it is the same as the target disk of any other blocks in the RAID group.

One or more embodiments of the processing described above with reference to FIGS. 4 and 5 can be described in pseudo code as follows:

Determine the target disk for every block

- Id_block_n = hash (content)
- Target-disk_block_n = Deterministic_function(Id_block_n)

Select the codeword for every block, based on the content-based identifier, not on the original block number

- Assigned = FALSE
- Target_Codeword_block_n = first_not_full_codeword
- REPEAT
- If (Target_disk_block_n ≠ already in Target_disks Target_Codeword_block_n )
    - Assigned = TRUE
   Else
    - Target_Codeword = next_not_full_codeword
- UNTIL Assigned For the redundant blocks:
Generate redundant blocks for every set of blocks belonging to the same codeword
For each redundant block in the codeword:
Target_disk_redundant_block_n=based on already used target disks in codeword deterministically select an unused disk
Perform deduplication of the disk locally.

Figure 6:
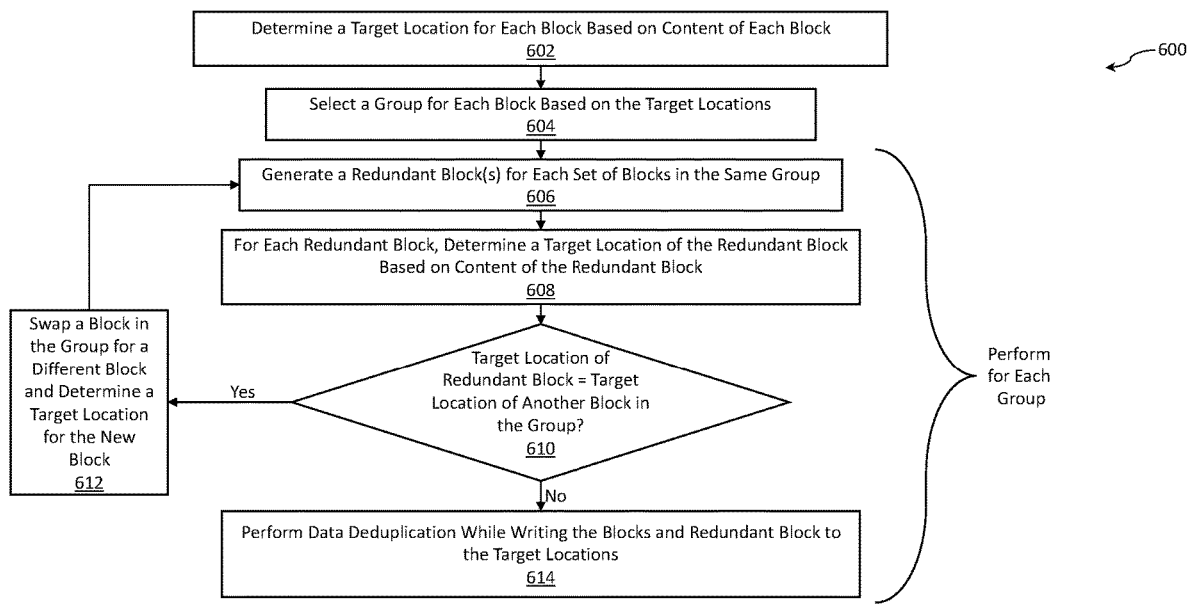
FIG. 6 is a flow diagram of a process for combining efficient reliable storage and deduplication in accordance with one or more embodiments of the present invention.

Turning now to FIG. 6, a flow diagram 600 of a process for combining efficient reliable storage and deduplication is generally shown in accordance with one or more embodiments of the present invention. The processing shown in FIG. 6 can be performed, for example, by data placement logic 102 of FIG. 1 or data placement logic 202 of FIG. 2 or data placement logic 302 of FIG. 3. At block 602, content based mapping is performed to determine a target location (e.g., a particular storage unit) for each block, or symbol, in a codeword to be written to a storage unit. For each block, a target location is determined based on the content of the block (e.g., the bits contained in the block). In accordance with one or more embodiments of the present invention, the determining includes generating a hash value of the content of the block and assigning the block to a particular storage unit based on the hash value. Ranges of hash values can be previously assigned to particular storage units. Examples of hash functions that can be used to generate the hash value include, but are not limited to modulo operations, division by a prime number, cyclotomic polynomials, or other functions that map a block to a storage unit that create a reasonable distribution of blocks across the available storage units. At block 604 of FIG. 6, the blocks are divided into groups such that each block in each group has a different target location based on its content.

Blocks 606-614 of FIG. 6 are performed for each group. At block 606, one or more redundant blocks used for recovery are generated based on contents of the blocks in the group. The redundant blocks can be generated in any manner known in the art, such as, but not limited to: generating a RAID 5 erasure block; generating bi-directional parity blocks; generating Reed-Solomon blocks, etc. The extended set of block(s), together make up a codeword that is recoverable as a unit. At block 608, for each redundant block, a target location is determined based on content of the redundant block (e.g., the bits contained in the redundant block). Similar to the other blocks in the group the determining a target location for the redundant block can include generating a hash value of the content of the block and assigning the block to a particular storage unit based on the hash value.

At block 610, it is determined whether the target location of any of the redundant blocks is the same as the target location of another block in the group. If the target location (s) of the redundant block(s) is different than the target location of the other blocks in the group, then processing continues at block 614 where the codeword is written to the target locations by the storage system using inline block based deduplication. As described previously, a hash function of the block to be stored can be calculated (a different hash function than the one used to determine the storage unit) and used to retrieve blocks, if any, that have the same hash, and those blocks are compared to the block to be stored. If an identical block is found then instead of storing the block itself a pointer to the block is stored, requiring substantially less storage. Also, a reference count can be incremented to ensure that a block is erased only after all references to the block are erased. The deduplication logic may be implemented in software, in a storage controller, and/or inside a storage device.

If it is determined at block 610 that the target location(s) of the redundant block is the same as the target location of the other blocks in the group (including other redundant blocks if any) then processing continues at block 612 where a block in the group is swapped for a different block and a target location of the new block is generated based on content of the new block. Processing continues at block 606. Blocks 606, 608, 610, and 612 can be performed until each block in the group of blocks and its corresponding redundant block(s) all have different target locations.

There are tradeoffs between the process shown in FIG. 4 and the process shown in FIG. 6. Because the process shown in FIG. 6 maps all blocks to a storage unit based on a content-based hash, this process can achieve better deduplication when compared to the process shown in FIG. 4 but at the added expense of additional computing.

In accordance with one or more embodiments of the present invention, the blocks of data are encrypted prior to the processing described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
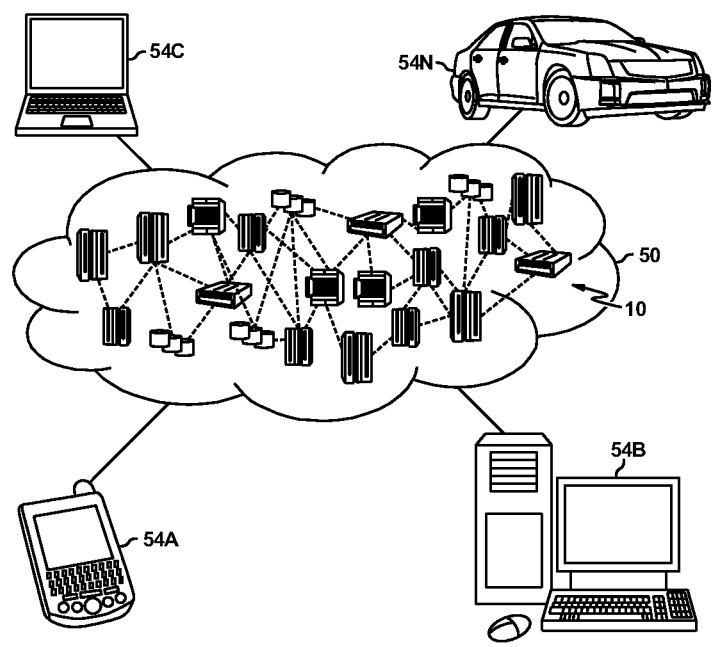
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 8:
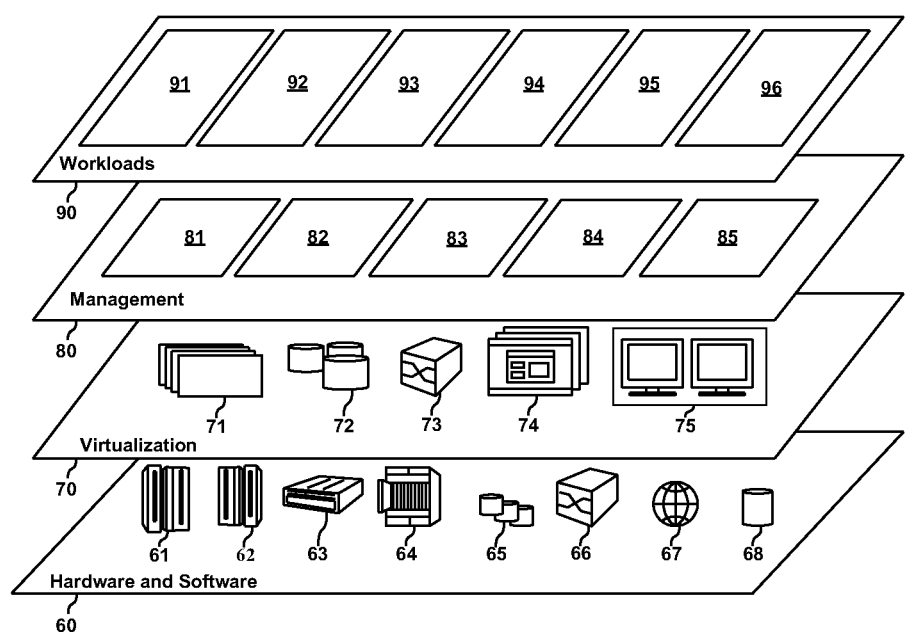
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In accordance with one or more embodiments of the present invention, the storage units and the data placement logic are located in the cloud computing environment of FIG. 7. The storage units can be included in the hardware components and the data placement logic in the software components of hardware and software layer 60.

Figure 9:
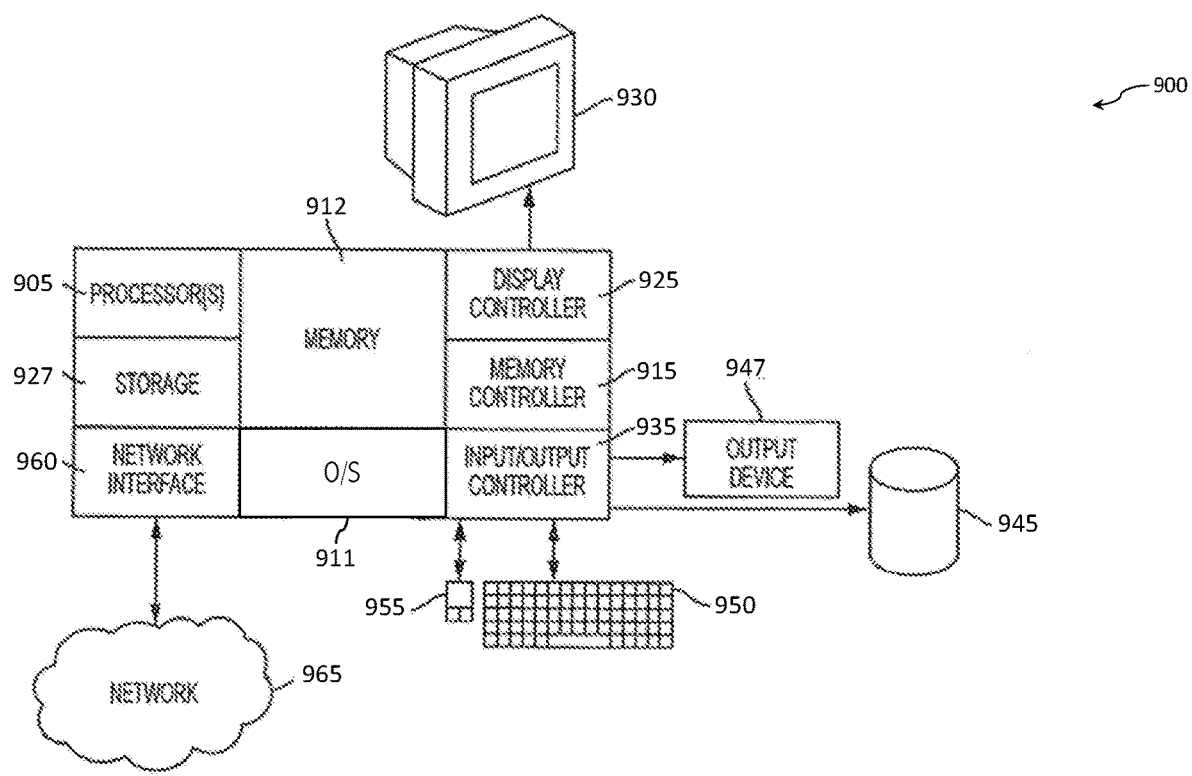
FIG. 9 is a block diagram of a computer system for implementing some or all aspects of a storage system that combines efficient reliable storage and deduplication in accordance with one or more embodiments of the present invention.

Turning now to FIG. 9, a block diagram of a computer system for implementing some or all aspects of providing storage systems that combine and deduplication is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 900, such as a mobile device, personal computer, workstation, minicomputer, or mainframe computer.

In an exemplary embodiment, as shown in FIG. 9, the computer system 900 includes a processor 905, memory 912 coupled to a memory controller 915, and one or more input devices 945 and/or output devices 947, such as peripherals, that are communicatively coupled via a local I/O controller 935. These devices 947 and 945 may include, for example, a printer, a scanner, a microphone, and the like. A conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 947, 945 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 912. The processor 905 may be a custom made or commercially available processor, a central processing unit (CPU), an auxiliary processor among several processors associated with the computer system 900, a semiconductor based microprocessor (in the form of a microchip or chip set), a microprocessor, or other device for executing instructions. The processor 905 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 912 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 912 may incorporate electronic, magnetic, optical, or other types of storage media. Note that the memory 912 may have a distributed architecture, where various components are situated remote from one another but may be accessed by the processor 905.

The instructions in memory 912 may include one or more separate programs, each of which comprises an ordered listing of executable instructions for implementing logical functions. In the example of FIG. 9, the instructions in the memory 912 include a suitable operating system (OS) 911.

The operating system 911 essentially may control the execution of other computer programs and provides scheduling, input-output control, file and data management, memory management, and communication control and related services.

Additional data, including, for example, instructions for the processor 905 or other retrievable information, may be stored in storage 927, which may be a storage device such as a hard disk drive or solid state drive. The stored instructions in memory 912 or in storage 927 may include those enabling the processor to execute one or more aspects of the dispatch systems and methods of this disclosure.

The computer system 900 may further include a display controller 925 coupled to a display 930. In an exemplary embodiment, the computer system 900 may further include a network interface 960 for coupling to a network 965. The network 965 may be an IP-based network for communication between the computer system 900 and an external server, client and the like via a broadband connection. The network 965 transmits and receives data between the computer system 900 and external systems. In an exemplary embodiment, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing multiple providing storage systems that combine redundant array of independent disks (efficient reliable storage) and deduplication as described herein can be embodied, in whole or in part, in computer program products or in computer systems 900, such as that illustrated in FIG. 9.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving data to be written to a plurality of storage units, the data comprising a plurality of symbols;
determining a target storage unit in the plurality of storage units for storing each of the plurality of symbols, the determining based at least in part on a hash value of content of each of the plurality of symbols, wherein ranges of hash values have been previously assigned to particular storage units of the plurality of storage units;
selecting a group of n symbols from the plurality of symbols, wherein each of the n symbols in the group is determined to have a different target storage unit;
mapping the group of n symbols into a codeword of n+k symbols;
assigning each of the n+k symbols to one of the plurality of storage units,
wherein the codeword is configured to allow at least one of the n symbols to be reconstructed using a subset of the n+k symbols and each of the n symbols is assigned to its target storage unit; and
initiating writing each of the n+k symbols to its assigned storage unit in the plurality of storage units, wherein the writing comprises for each of the n+k symbols, optimizing storage capacity of the assigned storage unit based at least in part on determining that the symbol has the same content as another symbol previously stored in the storage unit, the optimizing comprising performing data deduplication of the symbol and the another symbol.

2. The method of claim 1, wherein the codeword is configured to allow all of the n symbols to be reconstructed using a subset of the n+k symbols.

3. The method of claim 1, further comprising, prior to the mapping, encrypting the data.

4. The method of claim 1, wherein the data deduplication comprises storing a pointer to the symbol previously stored in the storage unit and not writing the symbol to the storage unit.

5. The method of claim 1, wherein the symbol is a block and the storage units are block storage devices.

6. The method of claim 1, wherein the storage units are disks.

7. The method of claim 1, wherein the storage units are storage servers.

8. A system comprising:
a memory having computer readable instructions; and
one or more processors for executing the computer readable instructions, the computer readable instructions controlling the one or more processors to perform operations comprising:
receiving data to be written to a plurality of storage units, the data comprising a plurality symbols;
determining a target storage unit in the plurality of storage units for storing each of the plurality of symbols, the determining based at least in part on a hash value of content of each of the plurality of symbols, wherein ranges of hash values have been previously assigned to particular storage units of the plurality of storage units;
selecting a group of n symbols from the plurality of symbols, wherein each of the n symbols in the group is determined to have a different target storage unit;
mapping the group of n symbols into a codeword of n+k symbols;
assigning each of the n+k symbols to one of the plurality of storage units,
wherein the codeword is configured to allow the n symbols to be reconstructed using a subset of the n+k symbols and each of the n symbols is assigned to its target storage unit; and
initiating writing each of the n+k symbols to its assigned storage unit in the plurality of storage units, wherein the writing comprises for each of the n+k symbols, optimizing storage capacity of the assigned storage unit based at least in part on determining that the symbol has the same content as another symbol previously stored in the storage unit, the optimizing comprising performing data deduplication of the symbol and the another symbol.

9. The system of claim 8, wherein the codeword is configured to allow all of the n symbols to be reconstructed using a subset of the n+k symbols.

10. The system of claim 8, further comprising, prior to the mapping, encrypting the data.

11. The system of claim 8, wherein the data deduplication comprises storing a pointer to the symbol previously stored in the storage unit and not writing the symbol to the storage unit.

12. The system of claim 8, wherein the symbol is a block and the storage units are block storage devices.

13. A computer program product comprising a computer readable storage medium having program instructions embodied therewith, the program instructions executable by a processor to cause the processor to perform operations comprising:
receiving data to be written to a plurality of storage units, the data comprising a plurality of symbols;
determining a target storage unit in the plurality of storage units for storing each of the plurality of symbols, the determining based at least in part on a hash value of content of each of the plurality of symbols, wherein ranges of hash values have been previously assigned to particular storage units of the plurality of storage units;
selecting a group of n symbols from the plurality of symbols, wherein each of the n symbols in the group is determined to have a different target storage unit;
mapping the group of n symbols into a codeword of n+k symbols;
assigning each of the n+k symbols to one of the plurality of storage units,
wherein the codeword is configured to allow the n symbols to be reconstructed using a subset of the n+k symbols and each of the n symbols is assigned to its target storage unit; and
initiating writing each of the n+k symbols to its assigned storage unit in the plurality of storage units, wherein the writing comprises for each of the n+k symbols, optimizing storage capacity of the assigned storage unit based at least in part on determining that the symbol has the same content as another symbol previously stored in the storage unit, the optimizing comprising performing data deduplication of the symbol and the another symbol.

14. The computer program product of claim 13, wherein the codeword is configured to allow all of the n symbols to be reconstructed using a subset of the n+k symbols.

* * * * *